US 8,448,212 B2

(12) United States Patent
Aarnio et al.

(10) Patent No.: US 8,448,212 B2
(45) Date of Patent: May 21, 2013

(54) COMBINED RECEIVER FOR DVB-H AND DVB-T TRANSMISSION

(75) Inventors: Ari Aarnio, Espoo (FI); Peter Dam Nielsen, Lyngby (DK); Ari Ikonen, Raisio (FI); Kyösti Koivisto, Kaarina (FI); Christian Kraft, Frederiksberg C. (DK); Pekka H. Talmola, Turku (FI)

(73) Assignee: Nokia Corporation, Espoo (FI)

( * ) Notice: Subject to any disclaimer, the term of this patent is extended or adjusted under 35 U.S.C. 154(b) by 1478 days.

(21) Appl. No.: 11/292,361

(22) Filed: Dec. 2, 2005

(65) Prior Publication Data

US 2007/0130610 A1 Jun. 7, 2007

(51) Int. Cl.
*H04N 7/16* (2011.01)
*H04N 7/173* (2011.01)
*H04B 7/08* (2006.01)

(52) U.S. Cl.
USPC .......... 725/62; 725/131; 725/139; 455/132

(58) Field of Classification Search
None
See application file for complete search history.

(56) References Cited

U.S. PATENT DOCUMENTS

| | | | | |
|---|---|---|---|---|
| 6,188,978 | B1 * | 2/2001 | Harada | 704/201 |
| 6,798,838 | B1 | 9/2004 | Ngo | |
| 7,123,669 | B2 * | 10/2006 | Ye et al. | 375/341 |
| 2002/0157096 | A1 | 10/2002 | Hane et al. | |
| 2003/0084448 | A1 * | 5/2003 | Soundararajan | 725/46 |
| 2005/0186931 | A1 * | 8/2005 | Laiho et al. | 455/280 |
| 2005/0216472 | A1 * | 9/2005 | Leon et al. | 707/10 |
| 2005/0252959 | A1 | 11/2005 | Gaumond et al. | |
| 2005/0257242 | A1 * | 11/2005 | Montgomery et al. | 725/116 |
| 2006/0019618 | A1 * | 1/2006 | Seppala | 455/121 |
| 2006/0059090 | A1 * | 3/2006 | Lahtinen et al. | 705/50 |
| 2006/0064443 | A1 * | 3/2006 | Duval | 707/202 |
| 2006/0067288 | A1 * | 3/2006 | Shim et al. | 370/338 |
| 2006/0130101 | A1 * | 6/2006 | Wessel van Rooyen | 725/100 |
| 2006/0174117 | A1 * | 8/2006 | Laitinen | 713/169 |
| 2006/0282870 | A1 * | 12/2006 | Chen | 725/118 |
| 2007/0044130 | A1 * | 2/2007 | Skoog | 725/110 |
| 2007/0067808 | A1 * | 3/2007 | DaCosta | 725/62 |
| 2007/0124770 | A1 * | 5/2007 | Guillorit | 725/56 |

FOREIGN PATENT DOCUMENTS

CN 1581334 A 2/2005
(Continued)

OTHER PUBLICATIONS

Machine translation of JP2006108902 published Apr. 2006; Matsushita.*
International Search Report for International Application No. PCT/IB2006/003262, mailed Jan. 25, 2008.

(Continued)

*Primary Examiner* — Mark D Featherstone
(74) *Attorney, Agent, or Firm* — Banner & Witcoff, Ltd.

(57) ABSTRACT

Provided are apparatuses and methods in a digital broadcast transmission system for receiving, processing and rendering transmitted content. A digital receiver capable of receiving and rendering both DVB-H and DVB-T signals may include a coupling means for connecting to another terminal for receiving program data or parameters. The digital receiver may reconfigure one or more components in order to handle the differing signal types. Such a receiver system allows a user to move seamlessly from a mobile device to a stationary device without significant effort and time. The receiver may further use transmission streams of varying priority to enhance and otherwise modify the displayed content according to a user's selection. Users with small display screens or poor eyesight may benefit from such enhancements features.

27 Claims, 10 Drawing Sheets

FOREIGN PATENT DOCUMENTS

| | | |
|---|---|---|
| EP | 1 180 903 A1 | 2/2002 |
| EP | 1193976 | 4/2002 |
| GB | 2399986 | 9/2004 |
| JP | 2006108902 * | 4/2006 |
| WO | 0147248 | 6/2001 |
| WO | WO 2004056096 A1 * | 7/2004 |
| WO | WO 2004066652 A1 * | 8/2004 |

OTHER PUBLICATIONS

First Office Action for Chinese Patent Application No. 2006800490606, mailed Mar. 25, 2010, 30 pages.
Communication in EP 06820914.7-2223 dated Jul. 26, 2012.
Supplementary European Search Report in EP06820914.7-2223 dated Jul. 10, 2012.

* cited by examiner

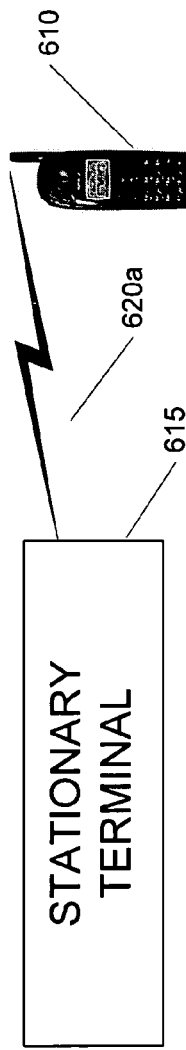
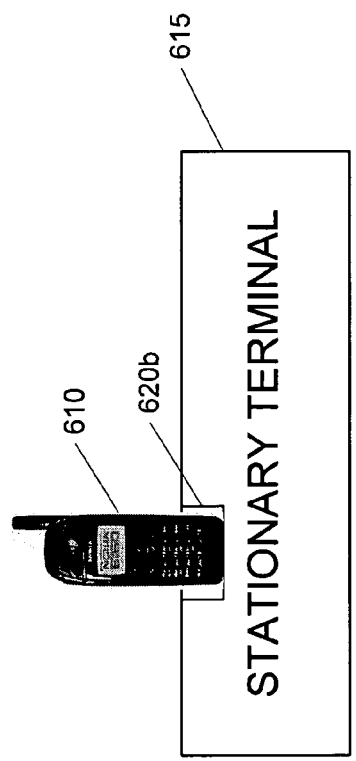
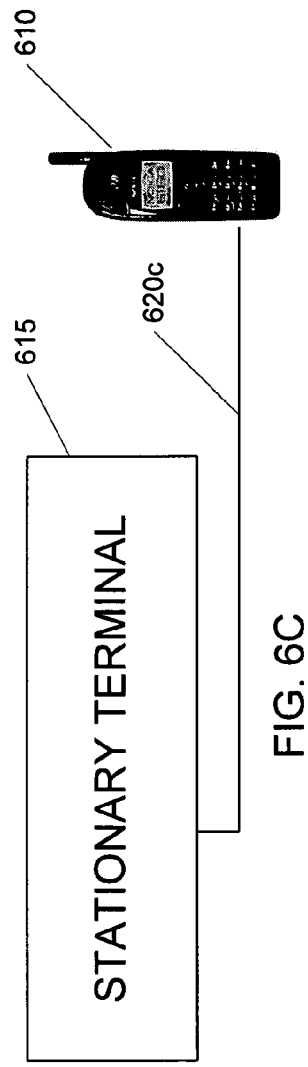
FIG. 6A
FIG. 6B
FIG. 6C

COMBINED RECEIVER FOR DVB-H AND DVB-T TRANSMISSION

FIELD OF THE INVENTION

The invention relates generally to a method and a system of receiving and processing digital transmission. Specifically, the invention relates to receiving and rendering a plurality of types and formats of digital transmissions.

BACKGROUND OF THE INVENTION

Digital technologies have become an increasingly popular solution to many problems as the digital age becomes increasingly influential in society. As such, many aspects of daily life have become digitized. Radio, for instance, has joined the digital realm in the form of satellite radio (i.e., XM Satellite Radio, SIRIUS) in order to garner and serve a larger audience. Similarly, the widespread acceptance and use of digital television has significantly changed the television landscape (i.e., DirecTV®, Digital Cable TV). For example, many European countries have adopted a set of digital transmission standards known as DVB-T, DVB-S, DVB-C and DVB-H in order to facilitate the shift into digital video broadcasting from current analog methods. The quality and flexibility of such digital transmission formats has made such technology an attractive alternative to current media formats.

One significant issue with mobile devices is power consumption and battery life. To address these concerns, differing standards have been developed and adopted for stationary devices and mobile devices. For example, the DVB-T transmission standard discussed above provides streaming (i.e., continuous) transmissions for continuously powered systems while the DVB-H transmission format transmits content using time-slicing (i.e., discontinuous) technology. Due to this dichotomy in transmission formats, differing types of receivers are required to receive the streaming and time-sliced transmissions. In another example, a mobile device user watches a soccer game transmitted via a mobile transmission format such as DVB-H while on his way home. Once home, the user would typically have to spend time tuning his home DVB-T receiver in order to find a channel with the same content (i.e., the soccer game). At present, there are limited methods of coordinating the content received on a mobile device via mobile transmissions formats with content received on a non-mobile device via terrestrial or stationary transmissions formats. Such a limitation of modern digital receiving technologies may unnecessarily constrain the adoption and use of both mobile and stationary/terrestrial transmission formats.

For the foregoing reasons, a system and method of enhancing the digital signal receiving and viewing capabilities of digital receivers is needed.

SUMMARY OF THE INVENTION

Many of the aforementioned problems are solved by providing a method and system of receiving both discontinuous (e.g., DVB-H, FLO) and continuous (e.g., DVB-T, DVB-C, DVB-S) signal streams with a single receiver. With a combined receiver for both types of digital transmission signals, a user could move seamlessly from watching a movie on his or her mobile device to watching the same movie on his or her television at home. The user would merely tune the stationary combined receiver to, for example, the same DVB-H station as the one on his or her mobile device.

In another aspect of the invention, the combined receiver may include a coupling means with which to connect a mobile device. By connecting the mobile device to the combined receiver, the combined receiver may automatically tune itself to the correct channel based on information received from the mobile device. Additionally, because continuous and discontinuous signals may be of two different levels of quality (e.g., DVB-H is of lower quality due to the potentially smaller bandwidth of mobile networks), the combined receiver may attempt to find higher quality corresponding streaming (i.e., continuous) content. For example, a user watching a visual radio show on his mobile device may be able to view the same show on a streaming channel with better resolution. By connecting his mobile device to the combined receiver, the receiver may evaluate program data and parameters received from the mobile device to search for a comparable streaming station or signal with the same or substantially similar content. Alternatively, the user may be presented with a list of channels or stations that have comparable content.

In yet another aspect of the invention, the continuous and discontinuous signals may include multiple layers of data. More specifically, these signals may have both basic data (a lower resolution) and enhanced data (higher resolution). In most mobile devices having limited display screen sizes and even in some household televisions with low resolution, the display may only utilize the basic data. Having a layered data system allows users of both high and low resolution displays to enjoy and view similar content. In addition, in systems where the display device may be too small to fully utilize the enhanced data in normal viewing, the user may activate a zooming feature. This zooming feature utilizes the enhanced data to provide a larger picture of the selected portion of the displayed content while maintaining video and image quality. Thus, the smaller displays or those displays with lower resolution are not constrained to miniscule or low-quality images.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIGS. 6A, 6B and 6C illustrate digital broadcast receivers with a connected mobile device according to one or more illustrative embodiments of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
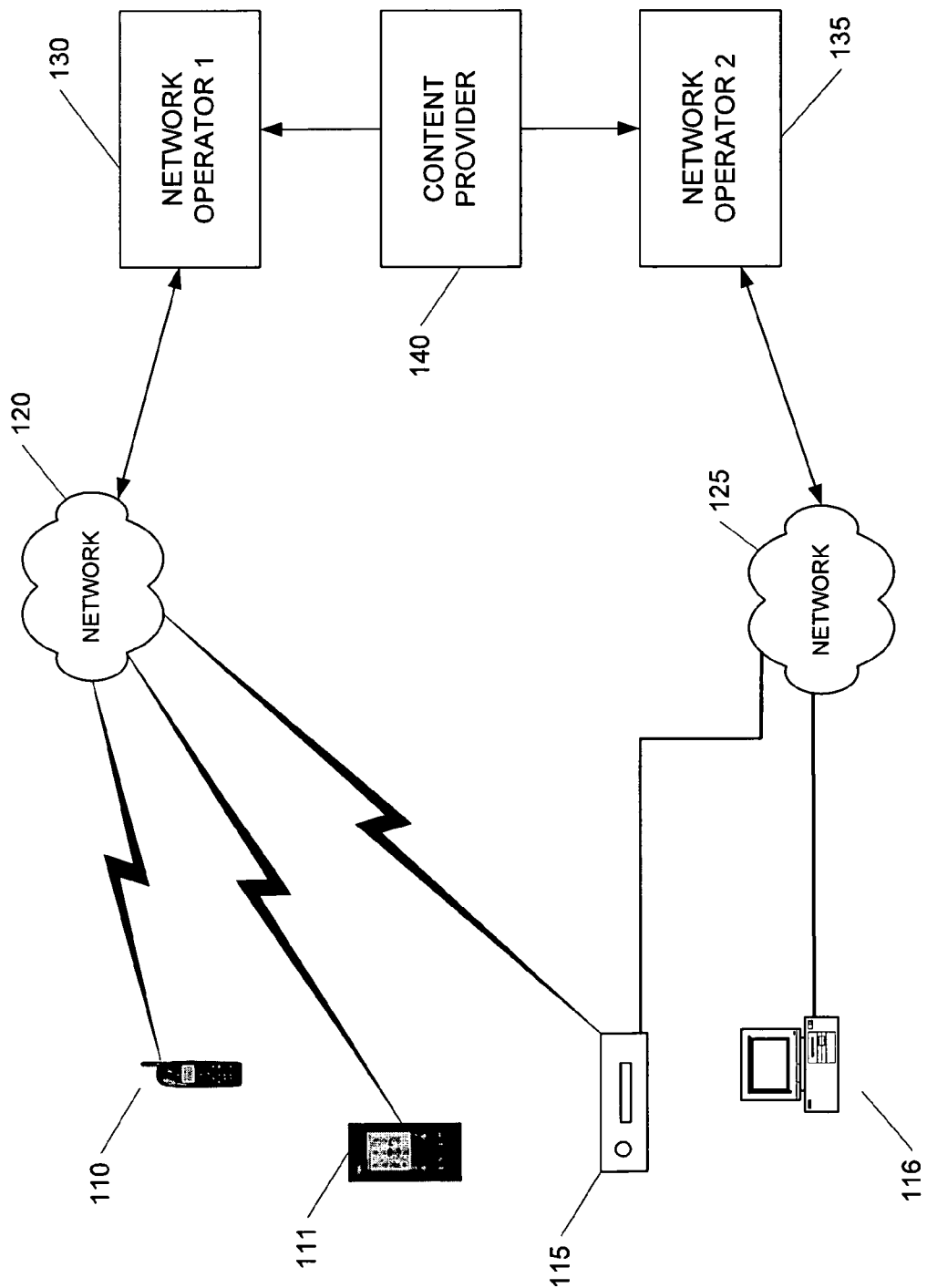
FIG. 1 illustrates a block diagram of a digital video broadcast system in which various aspects of the present invention may be implemented.

FIG. 1 illustrates a block diagram of a digital broadcast system in which various systems and methods of the present invention may be implemented. The digital video broadcast system may include one or more mobile terminals 110 & 111 such as cellular phones, portable video devices, PDAs, digital camcorders, portable audio systems, or combinations thereof, and one or more stationary terminals 115 & 116 that may include a desktop computer, a stationary television, home audio system, or combinations thereof. The terminals 110, 111, 115 & 116 may further have a digital broadband receiver (not shown) for receiving digital broadcast signals. Additionally, the mobile terminals 110 & 111 and stationary terminals 115 & 116 may each be connected to a content provider through various wired and wireless broadcast networks 120 & 125. The broadcast networks 120 & 125 may be operated and managed by network operators 130 & 135 which are responsible for distributing content 145 from a content provider 140 to receiving terminals 110, 111, 115 & 116. In addition to the actual content, the content provider 140 may provide and the network operators 130 & 135 may distribute other content information such as electronic service guides (ESG) and program specification information (SI/PSI). A content provider 140 may include radio stations, analog and/or digital television stations (i.e., NBC, ABC, CBS) and/or Internet content and access providers. Those of skill in the art will appreciate that there are many other types of content and service providers that may utilize a digital broadcast system.

Again, network operators 130 & 135 may utilize various types of communication networks and protocols. For example, network operator 120 may provide content data from content provider 140 via a broadcast network 120 that includes a cellular network. The cellular network may include a second/third-generation (2G/3G) cellular data communications network, a Global System for Mobile communications network (GSM), a Universal Mobile Telecommunications System (UMTS) or other wireless communication networks such as a WLAN network. Alternatively, network operator 135 may distribute content data via a broadcast network 125 that includes a computer based network such as wired and wireless local area networks (LANs) and wide area networks (WANs). In one aspect of the invention, a digital receiving device such as stationary terminal 115 may utilize both a cellular network as well as a computer based network in order to receive all content related data. For example, stationary terminal 115 may receive the actual content data (i.e., the audio/video of a show) via the computer based network. Other content relevant information such as user rights and access information, on the other hand, may be received through the cellular communication network.

Transmission formats and methods for transmitting signals to a mobile terminal 110 and signals to a stationary terminal 115 may differ. For example, a standard known as Digital Video Broadcast-Handheld (DVB-H) is used in Europe to broadcast content signals to mobile devices. The DVB-H standard is a part of the broader category of discontinuous transmissions standards. DVB-H and other discontinuous or time-sliced transmission methods are typically more suitable for mobile terminals 110 & 111 that run on battery power and may have limited processing resources. More particularly, DVB-H methods may significantly reduce power consumption, thereby providing longer battery life. In terms of stationary receiving terminals, however, continuous or streaming transmission standards may be more suitable. For example, Digital Video Broadcast-Terrestrial (DVB-T) may be used. DVB-T provides streaming data to a receiver since power consumption and receiver resources may not be as much of a concern in stationary receiving systems. Both DVB-T and DVB-H transmissions may be sent through the same broadcast networks 120 & 125 and selectively received by the terminals 110 & 115 in accordance with their processing and receiving capabilities.

Figure 2:
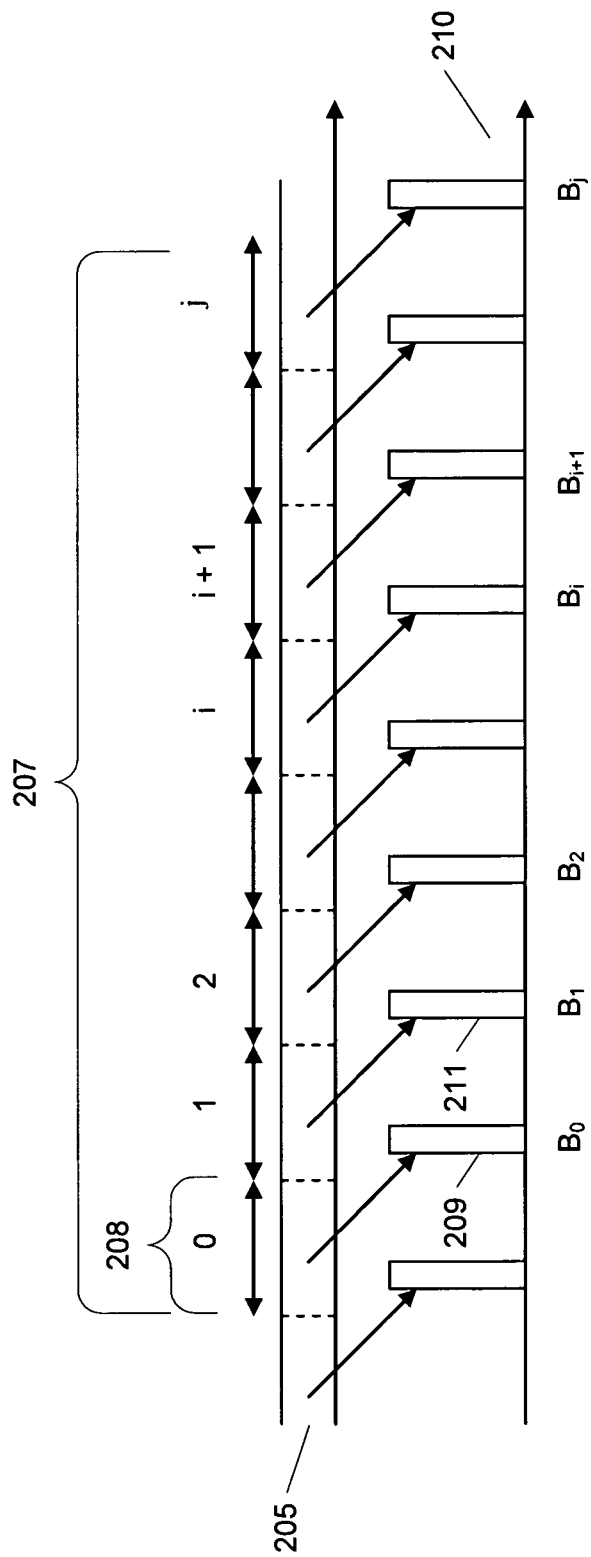
FIG. 2 illustrates a diagram of streaming and time-slicing methods of signal transmission according to an illustrative embodiment of the present invention.

In reference to FIG. 2, DVB-T and DVB-H may be transmitted using differing formats and methods. The upper time line 205 illustrates the streaming (i.e., continuous) characteristics of DVB-T transmissions. In streaming broadcast transmissions, the network operator transmits content in packetized form as it is received from the content provider. Thus, the content may be sent continuously over a specified time period. For example, in FIG. 2, the content is streamed to the receiver over a time period 207. Because content may be streamed over a virtually unrestricted period of time, the packetized content data may utilize less than the full bandwidth of the broadcast network. On the receiver side, a streaming transmission may require the receiver to be in an active or on state throughout the transmission period 207. This may not be a significant concern as long as the streaming transmissions are directed toward a stationary receiver with an unlimited power supply.

However, mobile devices may have insufficient power to receive and process such broadcasts despite modern advances in battery technology. Thus, mobile devices may use time-sliced or discontinuous transmission techniques which divide the content streams into larger packets that may utilize the full bandwidth of the broadcast network. In the DVB-H transmission time line 210, the data provided by a content provider is not transmitted continuously over a time period 207. Instead, the content data that would be transmitted over time period 0 208 in a DVB-T transmission scheme is sent in a burst 209 at time $B_0$. Similarly, content data corresponding to time period 1 is transmitted as burst $B_1$ 211 and so on. Because the content data is divided into larger packets, the bursts may be transmitted at periodic intervals rather than continuously. The periodic nature of time-sliced or discontinuous transmissions allows a mobile device to shut down power to transmission components during periods of non-transmission. Thus, power consumption in such a system may be reduced. Using time-slicing transmission may also enable a network operator to provide forward error correction (FEC) to ensure quality and integrity of the transmitted signals.

Figure 3:
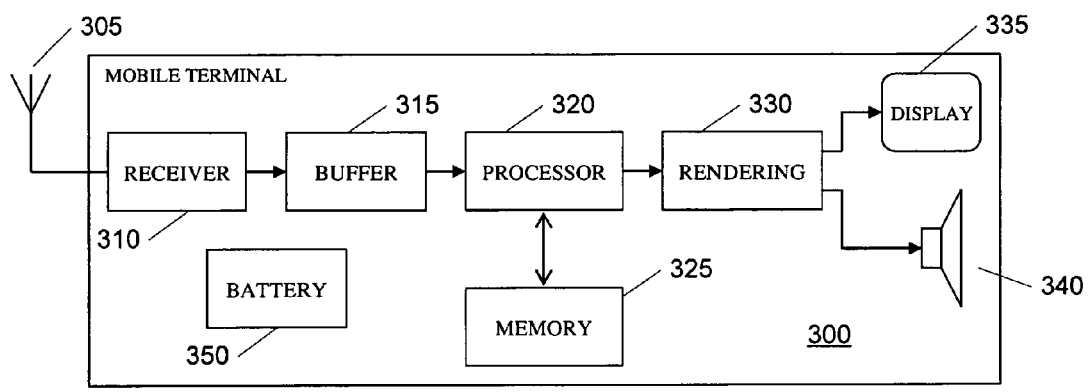
FIG. 3 illustrates a block diagram of a mobile device for receiving digital signals according to an illustrative embodiment of the present invention.

FIG. 3 illustrates a mobile terminal 300 configured to receive DVB-H (i.e., time-sliced or discontinuous) transmissions. The mobile terminal 300 may include a receiving antenna 305 to receive wireless transmissions. In addition, the mobile terminal 300 includes a receiving unit 310, a buffer 315, a processor 320, memory 325, a rendering unit 330 connected to a display 335 and an audio output 340. The receiver unit 310 in mobile terminal 300 may be configured to receive DVB-H formatted transmission signals. Upon parsing out the relevant content data and information, the receiver 310 forwards that information to a buffer 315 prior to processing. Because time-sliced transmissions are sent using bursts, the content data may be buffered in buffer 315 until the processing unit 320 is ready to handle the next burst of transmitted data. Moreover, the processing unit 320 may identify one or more pieces of information that should be stored in a memory 325. Such information may include receiving parameters for received content data, content provider identification information and/or supplemental content information (i.e., name of show, duration, brief synopsis). This permits a user to recall the name of the show or the duration of received content at any time during or after the content transmission. Once the processor 320 has distinguished the audio and video signals from the other content related data, the audio and video information is forwarded to the rendering unit 330. The rendering unit 330 processes the audio and video signals and provides the proper instructions to the display 335 for displaying the video and to the audio device 340 for outputting the corresponding audio. In processing the audio and video, the rendering unit 330 may further synchronize the audio and video and insure proper sequencing in outputting the content data.

As illustrated in FIG. 3, the mobile terminal 300 draws from battery unit 350 to power the other various components. In particular, battery unit 350 powers the receiver 310 and processor 320 during transmission times. As such, during periods of non-transmission in a time-slicing broadcast system, the receiver 310 and processing units 320 may be shut down to reduce overall power consumption in the mobile terminal 300. Other units may also be shut down depending on an operating mode of the mobile terminal 300.

Figure 4:
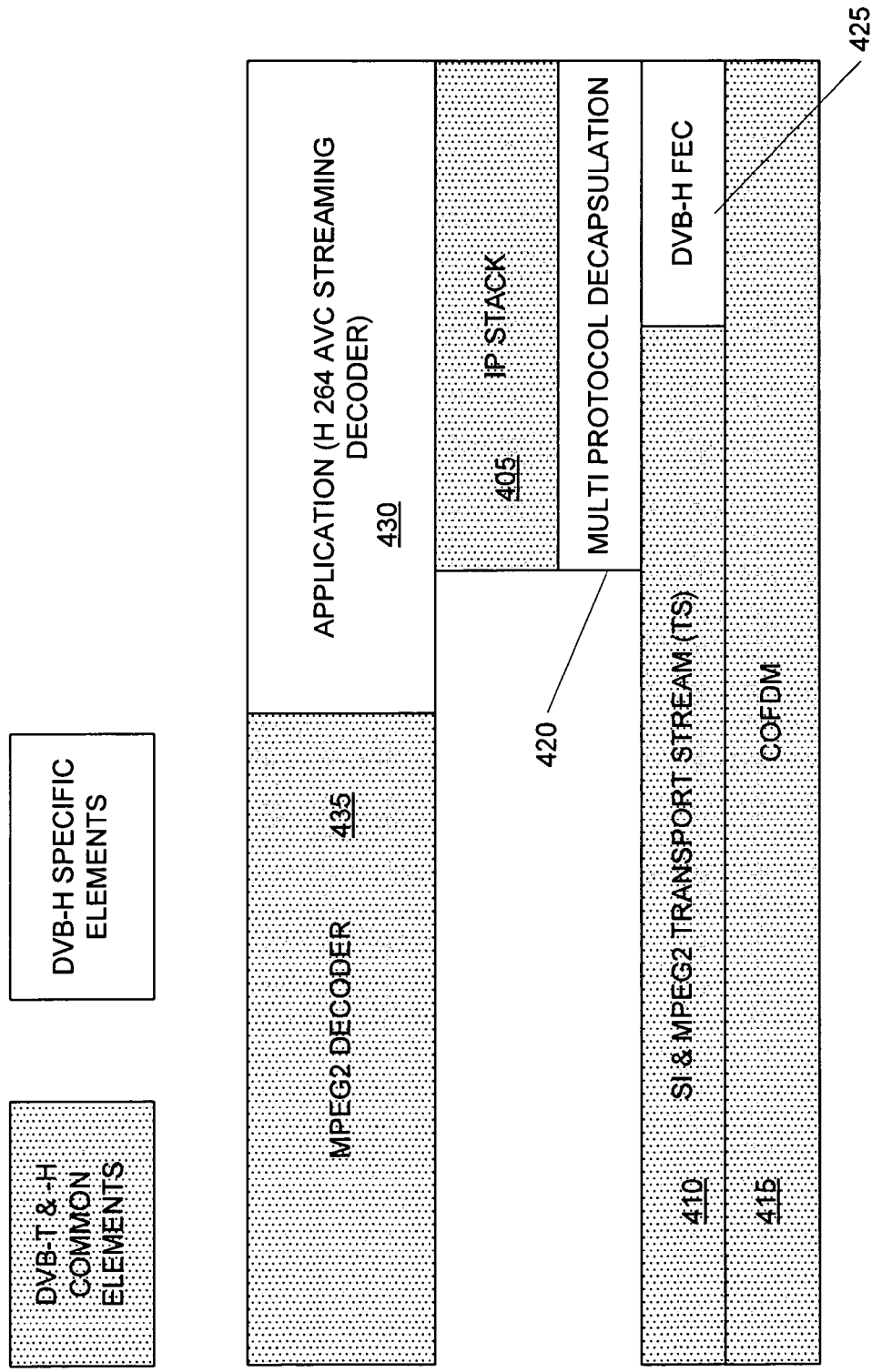
FIG. 4 illustrates common and format specific elements of a combined DVB-T/DVB-H receiver according to an illustrative embodiment of the present invention.

FIG. 4 illustrates components common and specific to DVB-T and DVB-H decoders in an illustrative embodiment of the present invention. A combined receiver capable of receiving and processing both DVB-T and DVB-H transmissions may include components that are used by both DVB-T and DVB-H transmission systems and elements specifically used by DVB-H networks. Such a combined receiver may be embodied and/or implemented in either a stationary or mobile terminal. The common elements may include an Internet Protocol (IP) stack 405, a Service Information (SI) & Motion Picture Experts Group (MPEG) 2 Transport Stream (TS) 410, a MPEG2 Decoder element 435 and a Coded Orthogonal Frequency Division Multiplexing element (COFDM) 415 may all be common elements to DVB-T and DVB-H broadcast systems. In one example, an IP datacasting (IPDC) network may be used to broadcast data. IPDC is a combination of digital broadcast and Internet Protocol and may be implemented with either DVB-T or DVB-H systems. Through such an IP-based broadcasting network, one or more service providers can supply different types of IP services including on-line newspapers, radio, and television. These IP services are organized into one or more media streams in the form of audio, video and/or other types of data. Thus, the IP stack 405 may provide a communication interface between IPDC hardware and applications on the mobile terminal.

The SI/MPEG2 Transport Stream 410 may be responsible for delivering audio and video data to a user through various delivery networks. The TS 410 may include a packetized data stream, with fixed length packets, including a header. The MPEG2 component of the transport stream 410 allows for MPEG2 encoded audio and video data to be multiplexed into and demultiplexed from the transmission. Additionally, the MPEG2 Decoder 435 may be used to process and render MPEG2 signal streams. Furthermore, Service Information (SI) or Program Specific Information (PSI) may further be embedded into the TS 410 for identification and location of content purposes. DVB broadcast systems have further adopted the COFDM modulation scheme in order to overcome multipath obstacles. In the COFDM scheme, a single digital signal may be divided across many signal carriers simultaneously. The signals are sent orthogonally to each other so there is no inter-signal interference. Thus, the COFDM element 415 may aid in the reception and demodulation of received signals transmitted in this manner.

Other components that are specific to DVB-H systems but that may be combined with the above-described elements in a single receiver system include a decapsulation unit 420 for Multi Protocol Encapsulation (MPE) sections, a Forward Error Correction (FEC) element 425 and an application decoder 430. A Multi Protocol Decapsulation element 420 may be used to combine various signals formats such as MPEG-2 and IP packets into a single stream. Additionally, the decoder application 430 permits the receiver to receive and decode audio and video signals compressed using digital codecs such as H.264/AVC. Compression codecs such as H.264/AVC are generally used in DVB-H systems to preserve good video quality while substantially lowering the necessary bit rates. In one example, the H.264/AVC compression codec reduces the bit rate by half of what previous standards such as MPEG-2 and H.263 would require. As discussed previously, the forward error correction element 425 serves to protect the integrity and quality of content data transmitted to the receiver. More specifically, the FEC method transmits data, such as Reed-Solomon coded data for correcting errors in the received application data. These DVB-H specific elements may be combined with the common elements using either software or hardware components to implement a single DVB-H/DVB-T compatible receiver.

In one illustrative embodiment, many of the common and specific elements may be implemented in a rendering device. Generally, a rendering device is responsible for rendering received audio, video and other types of media signals. In a combined receiver, the rendering device may be reconfigurable to facilitate the rendering of audio and video signals of multiple formats. For example, if the receiver tunes to a discontinuous (e.g, DVB-H) transmission, the rendering device may be switched to a monaural audio processing mode. On the other hand, the rendering device may be reconfigured to receive and process stereophonic audio signals when handling continuous (e.g., DVB-T) transmissions. Video signals may be received, identified and processed in similar fashion. Thus, by identifying the type of transmission received, the combined receiver may configure the rendering unit to process the corresponding type of audio and video signals by, for example, using different elements or units.

Figure 5:
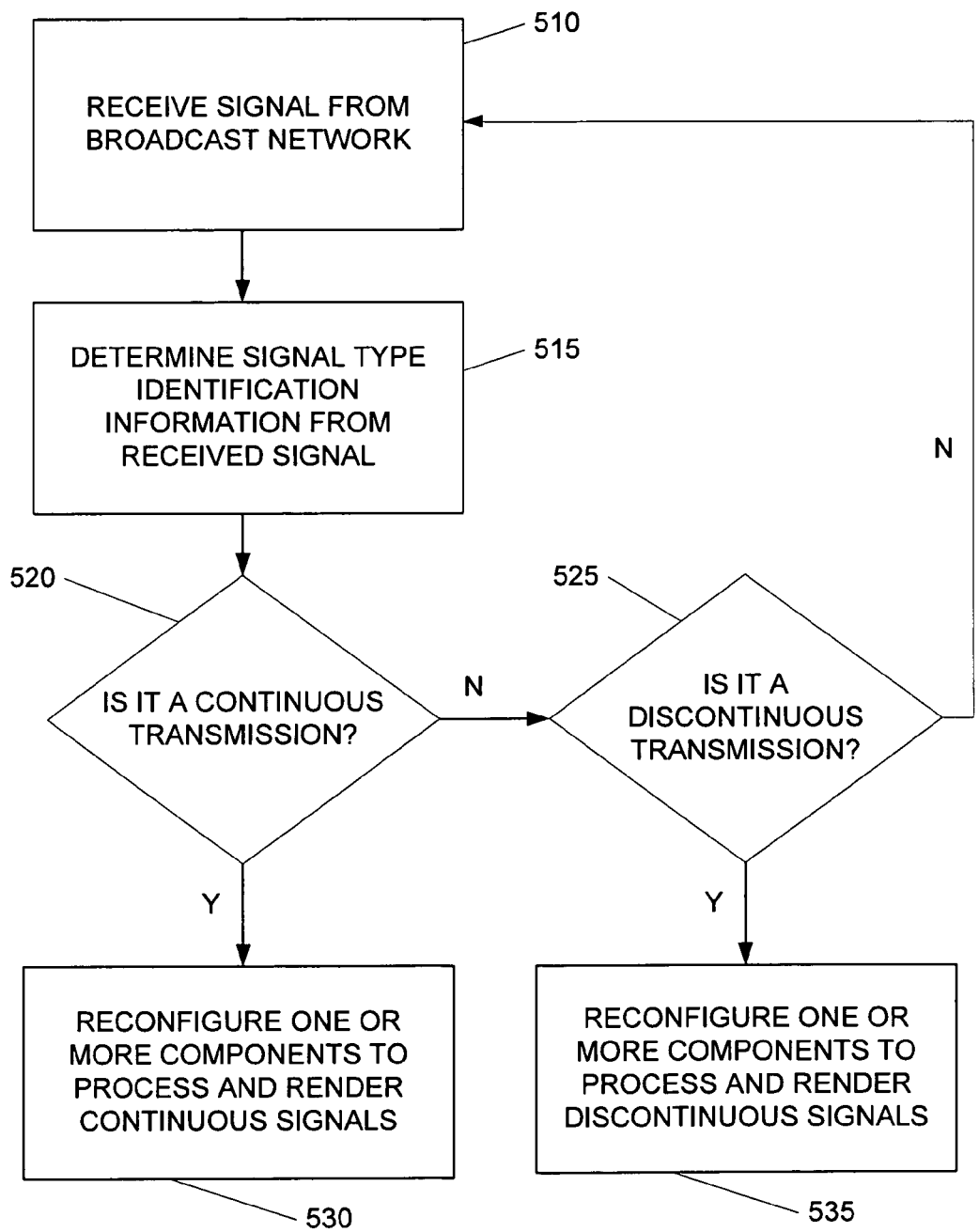
FIG. 5 illustrates an exemplary method for processing and rendering multiple transmission formats in a combined receiver according to an illustrative embodiment of the present invention.

FIG. 5 illustrates an exemplary method of receiving and processing multiple signal types according to an illustrative embodiment of the invention. In step 510, a combined receiver receives a broadcast signal through a receiving antenna. In step 515, the combined receiver may determine whether the signal format conforms to a particular category of signals (e.g., DVB signals). If not, the receiver may simply ignore the signal. If it does conform, then in step 520, the receiver may extract signal type identification data from the transmission. For example, the signal may comprise Transmission Parameter Signaling (TPS) bits that announce whether the signal is a DVB-T signal or a DVB-H signal. Alternatively, such identification information may be determined from SI/PSI data. One of skill in the art will appreciate that signal type information may be embedded in a variety data carried by a broadcast signal. In step 525, the receiver determines whether the received signal is a continuous transmission (e.g., DVB-T) or a discontinuous transmission (e.g., DVB-H) based on the identification information. Upon determining that the signal is a continuous transmission, the receiver terminal would configure one or more components (e.g., a rendering unit) to process and render continuous transmissions in step 530. The rendering and processing may be performed by one or more processors and/or rendering components (e.g., rendering unit 330). On the other hand, if the signal is a discontinuous transmission, the terminal would configure the one or more components to process and render discontinuous transmissions in step 535. Thus, a combined receiver for multiple signal types is capable of self-configuration (and reconfiguration) in response to detecting differing signal types.

The combined DVB-H/DVB-T receiver may further include a coupling means to receive data and parameters from a mobile terminal, as illustrated in FIGS. 6A, 6B and 6C. The mobile terminal 610 may include a receiver for DVB-H and/or DVB-T transmissions. Similarly, the stationary terminal 615 may include receiving elements for receiving and processing both DVB-H and DVB-T broadcast signals. The coupling means 620a, 620b and 620c may comprise either a wired or wireless connection. For example, in FIG. 6B, the coupling means may include a receiving port 620b and plug configuration for receiving a mobile terminal 610. More specifically, the stationary terminal 615 may have a receiving port 620b that allows a mobile terminal 610 to physically mate with the stationary terminal 615. In FIG. 6A, a wireless connection (i.e., Bluetooth®, RF Network, infrared) is provided to wirelessly couple the mobile terminal 610 to the stationary terminal 615. In one particular example, the mobile terminal 610 and stationary receiver 615 may both have Bluetooth® wireless components and capabilities that allow the terminals 610 & 615 to send and receive a variety of data (e.g., program parameters, program data, multimedia signals) between the two without any physical connections. Alternatively, in FIG. 6C, the mobile terminal 610 may be coupled to the stationary terminal 615 via a wired connection 620c such as a serial or parallel cable, a USB cable, and/or a network cable.

A mobile terminal coupling means 620a, 620b or 620c may facilitate many operations on both the mobile terminal 610 and the stationary receiver 615. For example, a user traveling home from work while watching a television program may wish to immediately view the program on his home television upon arrival. With means to couple a stationary receiver 615 with a mobile terminal 610, the user may connect his or her mobile terminal 610 to the receiver and effortlessly tune the stationary receiver 615 to the correct DVB-H or DVB-T channel. In another aspect of an exemplary embodiment of the invention, a user may wish to determine a list of programs or content that is similar to the one he or she is currently or was previously viewing on a mobile terminal 610. The user may connect the mobile terminal to the combined receiver 615 and request a list of DVB-H and/or DVB-T content that are similar to content viewed on the mobile terminal. In addition, because DVB-H signals may often be of a lower visual quality than DVB-T signals, a stationary receiver 615 may receive content data and parameters of a DVB-H signal from the mobile terminal 610 and identify a corresponding DVB-T channel transmitting the same or substantially similar content. The content data and parameters described herein may include a variety of information such as a channel, a title, a description of the content, a genre and the like. If an exact match cannot be found, the stationary receiver 615 may also formulate a list of programs or content that corresponds to one or more of the received content parameters. Such a list may further comprise an indicator representing the similarity of content. The methods and features described above are explained and discussed in further detail in the following descriptions.

Alternatively, the stationary receiver 615 may be used to tune the mobile terminal 610. For example, a user watching a championship tennis match at home may need to go to the supermarket during the last set. Not wanting to miss a second of the action, the user may couple the mobile terminal 610 to the stationary receiver 615 to transfer the receiving parameters of the tennis match from the stationary receiver 615 to the mobile terminal 610. Upon reception, the mobile terminal 610 may automatically tune to the appropriate channel or store the parameters for later selection and viewing by the user. In another aspect of the invention, a stationary receiver 615 may receive and store content (i.e., audio and video of a broadcast program) from a broadcast network and transmit the content to a mobile terminal 610 via coupling means 620a, 620b & 620c. This allows a user to take content previously received and stored on a stationary receiver 615 on the road.

Program parameters may include a multitude of information that relates to the content data (i.e., audio and video of the received content) being transmitted or received. These program parameters may include the frequency or channel of a particular DVB-T or DVB-H content stream, the bit rate of the transmissions, SI/PSI data and/or ESG data. Thus, the transfer of program parameters from the mobile terminal 610 to a stationary receiver 615 (or vice versa) may enable terminals 610 & 615 to identify the content, content providers, and the like. Moreover, the transfer of such parameters may include transferring the real-time parameters of a time-sliced transmission. For example, each multi protocol encapsulation section contains a time parameter indicating the time to the next burst in a DVB-H broadcast system.

Figure 7:
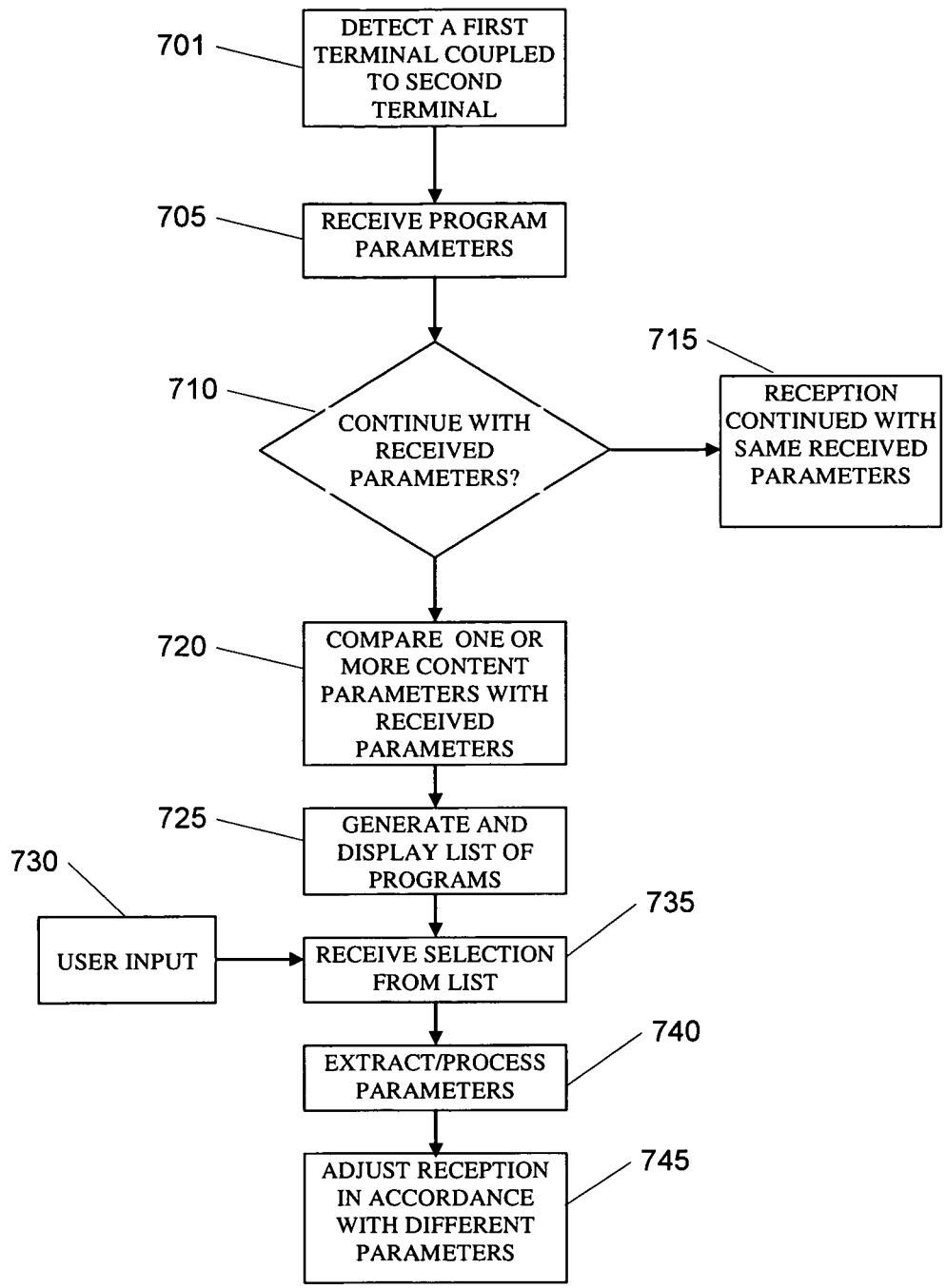
FIG. 7 illustrates a flow chart of an exemplary method of receiving and using program data and parameters from a connected terminal according to an illustrative embodiment of the present invention.

FIG. 7 illustrates a flow chart of an exemplary method of receiving and using program data and parameters from a connected device according to an illustrative embodiment of the present invention. In step 701, a first terminal (i.e., a mobile terminal) may be coupled to a second terminal (i.e., a stationary receiver) via a coupling means, including those described previously. Upon connecting, the second terminal may begin receiving one or more program parameters from the first terminal in step 705. Again, these program parameters may include tuning information, SI/PSI data and/or ESG data. The data may be received using a variety of protocols such as IP and Media Transfer Protocol.

Once the program parameters have been received by the second terminal, a decision is made in step 710 regarding whether to continue receiving the program with the received parameters or to identify a list of programs with similar or matching content. This decision may be a user selection or may be determined based on pre-stored user preferences. For example, a user may specify that all news shows should continue with the received parameters whereas for dramas, the stationary terminal should determine a list of similar, if not matching, programs. If the user or second terminal decides to continue with the received parameters, the second terminal modifies its own parameters to adopt the received parameters in step 715.

However, if either the user or the second terminal determines that a list of programs with similar or matching content would be appropriate or desirable, the received parameters are analyzed and processed in step 720. More specifically, the received parameters may be compared to multiple sets of parameters. Each set of parameters may correspond to content that was previously or is currently being received by the second terminal. The second terminal may include a memory that stores one or more program parameters of content previously received on the terminal. The comparison method of step 720 may further include determining a degree of similarity between the received parameters and the parameters of compared content. For example, the received parameters may indicate that the program is entitled "American Idol," was produced in the year 1995 and is of the science fiction genre. One set of parameters corresponding to previously received content X may indicate a program produced in 1995, including actor A but entitled "British Idol." Thus, while not a complete match, content X may receive a similarity rating of, for example, 66% (i.e., the percentage of parameters matched). Alternatively, the parameters may be weighted such that some parameters are more heavily considered than others. For instance, the genre of a program may receive a greater weight than the year in which it was produced or vice versa. The weighting of the parameters may be specified by the content provider or determined based on user preferences and settings. The comparison may take place in either a mobile terminal or stationary terminal depending on the resources and processing power of each unit.

Since the same content may be broadcast through several providers and in multiple formats (i.e., DVB-T vs. DVB-H), the second terminal may automatically tune to content that matches all or a substantial number of received parameters. For example, a television show may be broadcast in both DVB-T and DVB-H formats, the DVB-T transmission being of higher quality. Thus, upon connecting a mobile terminal receiving DVB-H transmissions to the second terminal, the second terminal may automatically determine and tune to a DVB-T channel broadcasting matching content. Moreover, a user may specify a predetermined threshold for determining a "perfect match." In one instance a user may require 100% of the parameters to match. In another, a user may consider an 85% parameter match sufficiently similar.

Regardless of the threshold, if no program provides the requisite level of similarity, the second terminal may generate and display a list of all programs with a predetermined level of similarity in step 725. Alternatively, a user may specify another threshold that corresponds to a level of similarity required to be included on such a list. Once the content list is displayed for user selection, the second terminal may receive user input in steps 730 & 735 indicating a selection from the list. The user selecting input may be made using a remote control device or an input pad on the second terminal itself. One of skill in the art will appreciate that there are a plethora of ways to receive user input corresponding to a selection.

After the second terminal receives the user selection, the program parameters corresponding to the selected content are extracted from memory in step 740. The extraction of relevant program parameters allows the second terminal to modify its tuning and reception parameters to receive the selected content in step 745.

Figure 8:
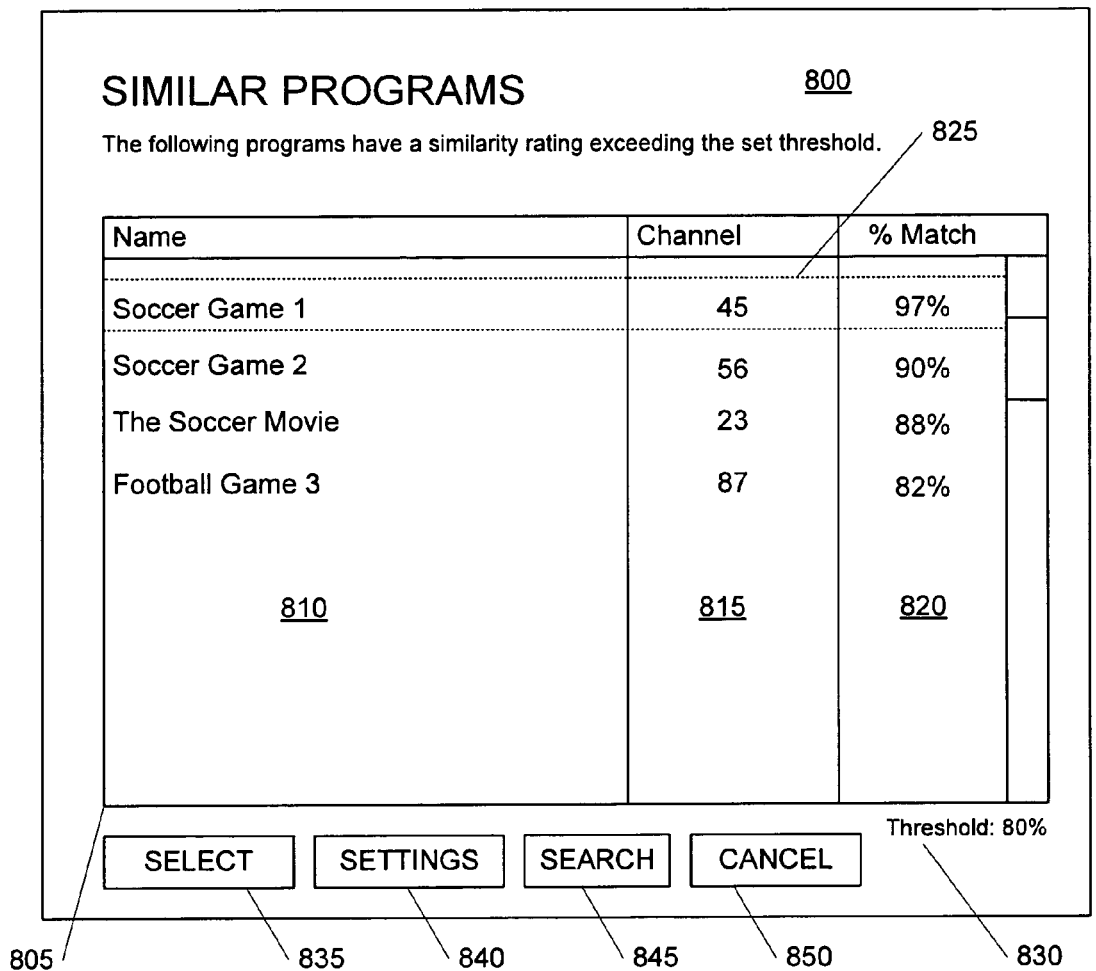
FIG. 8 illustrates a user interface for viewing and selecting from a list of programs according to an illustrative embodiment of the present invention.

FIG. 8 illustrates a user interface for viewing and selecting a list of programs with similar or matching content according to an illustrative embodiment of the present invention. The user interface 800 may display a list of programs 805 having matching or similar parameters to the program parameters received from a second terminal. The list of program 805 may include a name field 810, channel information 815 and a similarity indicator 820. The name field 810 may present information about the content of a particular program. This name or content information 810 may be acquired from ESG data, SI/PSI data or by a variety of other methods. The channel field 815 may provide tuning information so that a user may manually change to the channel corresponding to content displayed on the list 805. The tuning information may include not only channel numbers but also station designations (i.e., CBS, CNN, TBS). The channel information 815 may further allow a user to discern whether the corresponding content is available to him or her. For example, if Soccer Game 1 is shown on channel 45 and the user knows that he or she does not subscribe to channel 45, the user may disregard this entry in the list 805. Additionally, the similarity indicator 820 measures the similarity between the parameters of content in the program list 805 and a set of one or more parameters received from a second terminal. The similar program list 805 may be organized in a multitude of ways including alphabetically by content name, channel number or designation and/or the degree of similarity. The user may interact with the various headings in order to sort the entries by that field.

In additional to the program list 805, the user interface 800 may include a select option 835, a settings button 840, a search feature 845 and a cancel option 850. The select option 835 provides an option for a user to select a program from the program list 805 via a selection indicator 825. A user may alter his or her selection using any of a variety of input devices (not shown). The settings option 840 may open a settings dialog that permits a user to modify the settings of the user interface or, alternatively, to modify the parameters of the search. Such options may include a type of selection tool, color schemes, default ordering options, language settings and the like. In one example, a user may wish to alter the threshold 830 for matches included in the program list 805. Using the settings option 840, the user may, for instance, change the threshold 830 from 80% to 75%. Additionally, settings may be modified to allow certain parameters to alter a program's actual parameter match by a predefined amount. For example, if a user records a program, the program may be assigned a 75% match percentage regardless of how many of its parameters actually match with a set of search parameters. Alternatively, the fact that a program was recorded may increase the program's actual parameter match percentage by a predefined amount (i.e., a set percentage). In another example, the interest of a user may be taken into account in a similar manner. In other words, user interest may act as an additional parameter that provides an added probability of being displayed on a result list. Upon modifying the settings, the user may select the search feature 845 to perform a new search with the modified parameters and to refresh the program list 805. Additionally, if the user does not wish to make a selection from the program list 805 or wants to exit out of the program list user interface 800, he or she may select the cancel button 850.

As mentioned throughout this description, DVB-H and DVB-T signals may differ in quality. Because DVB-T transmissions are able to be divided into packets that do not fully utilize available bandwidth, DVB-T signals may simply increase packet size to carry higher quality audio and video. In contrast, DVB-H transmissions must consider power consumption of a mobile terminal and more specifically, the level of processing required as well as the time needed to receive the signal bursts. In some instances, a DVB signal may include multiple layers of data that correspond to different levels of audio and video quality. Thus, a mobile terminal or a stationary receiver receiving such signals may evaluate a number of layers to use in processing and rendering the content. The process of layered coding and hierarchical modulation in both DVB-T and DVB-H transmissions allows a signal to be separated into components of differing visual importance. In other words, a signal may be divided into a basic data stream and an enhanced data stream. The basic data stream may include signals for rendering content at a low resolution while the enhanced data stream provides data to refine the basic data and allow rendering of content at a higher resolution.

Figure 9:
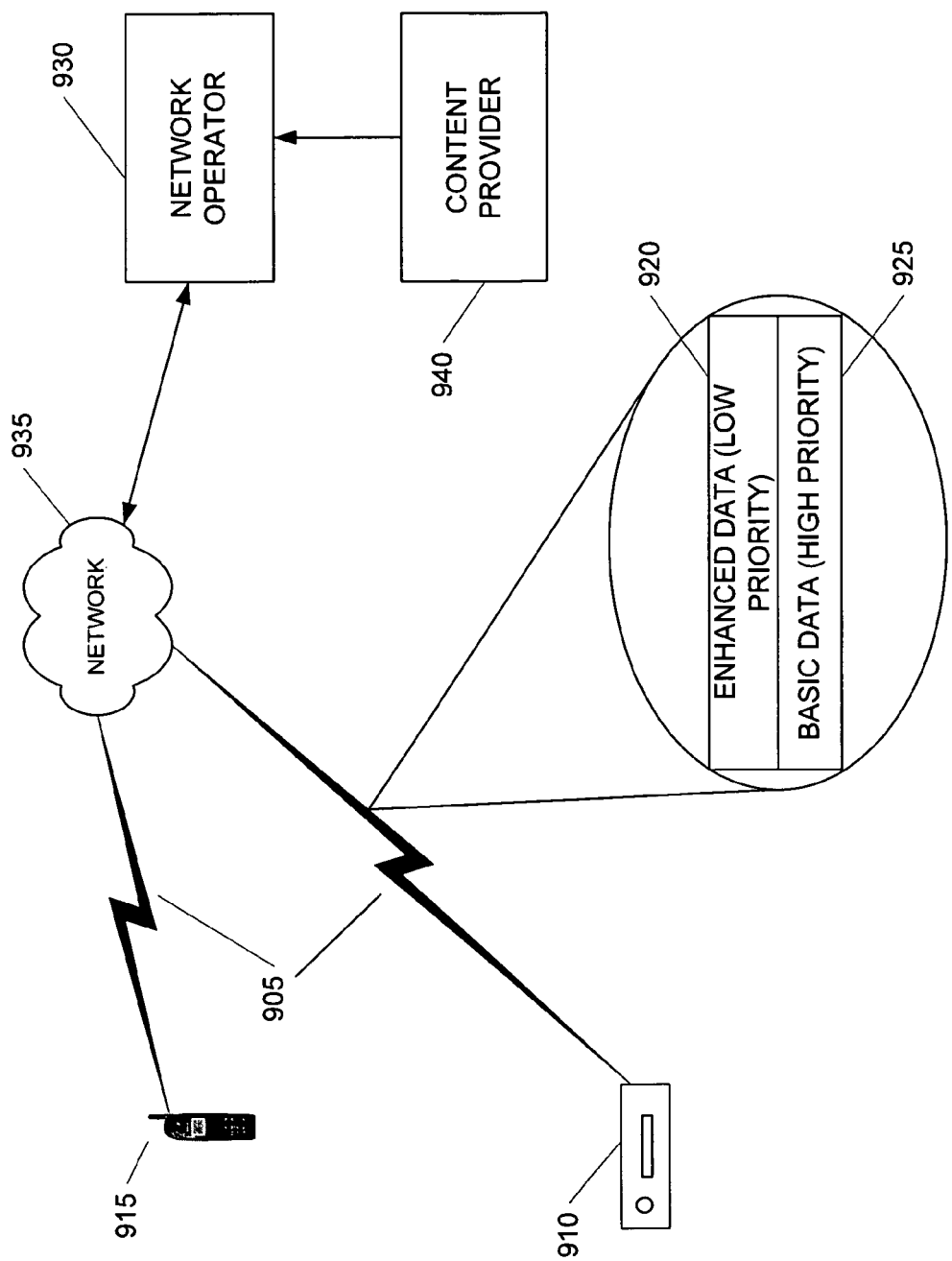
FIG. 9 illustrates a broadcast system using layered coding and hierarchical modulation according to an illustrative embodiment of the present invention.

FIG. 9 illustrates a broadcast system implementing layered coding and hierarchical modulation. Layered coding allows a content provider or network operator to transfer content of differing importance with a quality that matches that importance. In other words, more important layers of content may be transferred in a class with guaranteed quality, while a layer that merely enhances the quality may be sent as best effort. In one model of layered coding, a video signal may consist of a base layer (i.e., layer of highest importance) and multiple enhancement layers. The base layer may be decoded independently of the other layers whereas the multiple enhancement layers are generally not useful without the base layer.

In order to transmit such layered content, hierarchical modulation may be used to combine the multiple streams (i.e., layers) into a single transmission stream 905 for transmission. In such a system, the basic data stream may be designated high priority (HP) while the enhanced data is considered low priority (LP). Depending on the capabilities of the receiving terminals 910 & 915, one or both of the signal streams 920 & 925 may be received. For example, a receiver 910 with good reception conditions may receive both the LP and HP signal streams 920 & 925. For a receiver with poor reception 915, only the HP signal stream 925 may be received. However, both streams 920 & 925 are not necessarily used simply based on the fact that they are both received. In fact, mobile terminals with smaller display devices may determine that the lower priority (enhanced data) stream would not provide any significant quality enhancement given the attached display size. Moreover, the mobile terminal may determine that processing the lower priority stream would unnecessarily waste processing resources. In either case, the enhanced data may not be used and/or rendered.

However, a terminal may implement a zooming feature that would enable a user to realize the benefits of the high priority signal stream. A zooming feature would allow a user to select a portion of the displayed content to enlarge. Typically, enlarging a portion of a display results in lower resolution because the image is stretched without additional resolution. However, with low and high priority signal streams, the high priority signal stream containing enhanced data could be used to "fill in" the resolution lost by the enlargement or zooming.

Figure 10A:
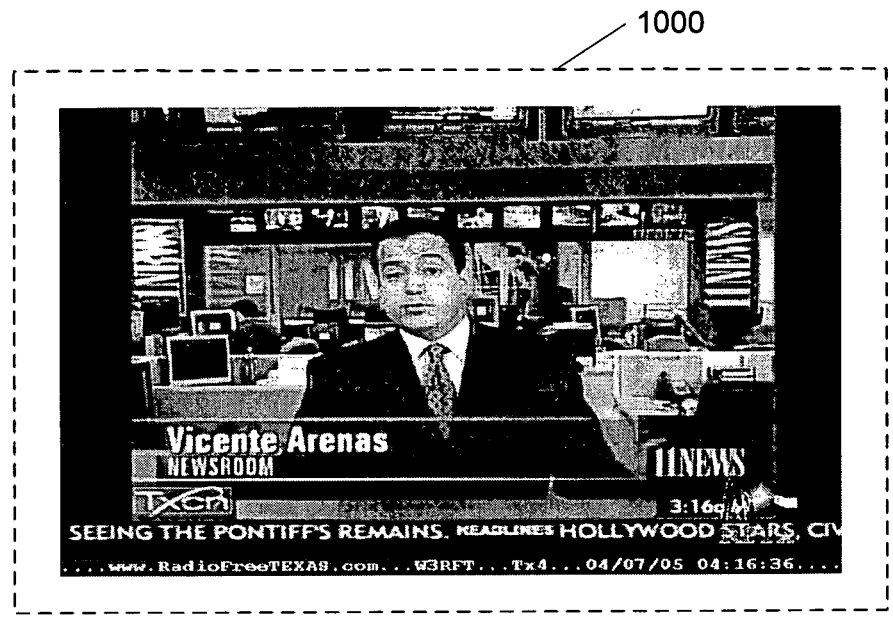
FIGS. 10A & 10B illustrate displayed content on a display device with and without a visual enhancement feature according to an illustrative embodiment of the present invention.
Figure 10B:
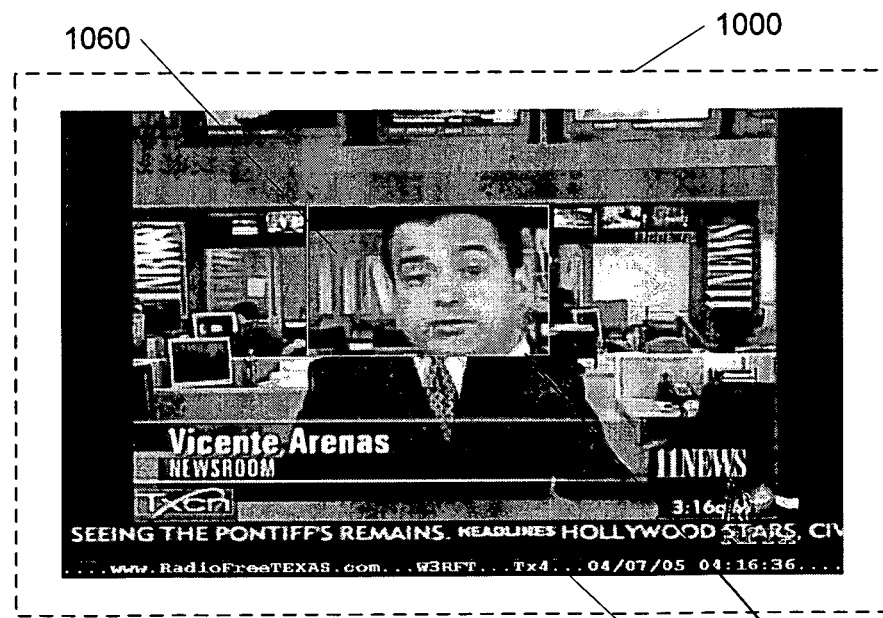

In FIGS. 10A and 10B, two display screens with displayed content are illustrated. FIG. 10B illustrates a display screen with a zooming feature and FIG. 10A illustrates a display screen 1000 without such a feature. In FIG. 10A, the terminal may receive both HP and LP signal streams, but may only render the LP signal stream in consideration of the size display screen 1000. In FIG. 10B, the user may use a "zoom box" 1055 or any other form of selection shape to select a portion 1060 of the displayed content 1050. Upon selecting a portion 1060 of the display content 1050, the selected portion may be enlarged (or zoomed). A user may manipulate the zoom selection shape 1055 using a keypad (not shown) or any other user input device. Possible methods of manipulation include stretching or expanding the selection shape 1055 or moving the selection shape 1055 to a desired portion of the displayed content 1050 or screen 1000. In addition, other zoom feature settings may be applied including a continuous zoom function or a zoom upon demand option. The continuous zoom function may activate the zoom feature continuously while a user moves the zoom selection shape 1055 around the display 1000. Alternatively, the zoom upon demand option may only activate the zoom feature once the user has committed to a portion of the display and manually enables zooming.

The zooming feature may be implemented in both mobile terminals and stand-alone devices. The zooming feature may further be beneficial in a variety of applications and situations including aiding poor eyesight. In addition, text may often be too small to read on a small display device and therefore, such a zooming function may provide a solution. The content for the area corresponding to the zoom box is extracted from the higher quality data stream while the remaining picture area is extracted from the lower quality data stream. Such a zooming function may also be beneficial in systems with stand-alone displays. In one example, a user watching a football game on a stand-alone television may wish to zoom in on the football to determine if it crossed the goal line. Thus, using layered coding to provide a zooming feature has a wide array of applications.

While many of the systems and methods have been described with respect to DVB-T and DVB-H transmission standards specifically, one of skill in the art will appreciate that such systems and methods may be applied to all forms of continuous and discontinuous transmission methods. Additionally, the "streaming" and "time-sliced" transmissions described throughout the specification may, alternatively, be regarded as "continuous" and "discontinuous" transmissions, respectively. More specifically, streaming transmissions may be considered a type of continuous transmissions while time-sliced methods may be a form of discontinuous transmissions. Examples of other continuous transmission standards include DVB-C (cable) and DVB-S (satellite). Other forms of discontinuous transmission may include Forward Link Only (FLO)-type transmissions among others.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. An apparatus comprising:
  a storage buffer configured to store one or more received digital broadcast transmissions;
  a processor and memory storing executable instructions, that when executed, cause the apparatus to identify a signal type of the one or more received digital broadcast transmissions, wherein the signal type comprises one of a continuous transmission and a discontinuous transmission; and
  a rendering unit configured to render video content carried in the one or more digital broadcast transmissions based on the identified signal type of the transmissions, wherein the executable instructions, when executed, cause the apparatus to automatically reconfigure the rendering unit to be in a first configuration when the identified signal type is the discontinuous transmission and a second configuration different from the first configuration when the identified signal type is the continuous transmission, wherein, when in the first configuration, the rendering unit is configured to render the video content having a first visual quality. and when in the second configuration, the rendering unit is configured to render the video content having a second visual quality, the first visual quality being different than the second visual quality.

2. The apparatus of claim 1, further comprising:
a coupling unit configured to connect the apparatus to a terminal capable of receiving the discontinuous digital transmissions.

3. The apparatus of claim 1, wherein at least one of the continuous transmission and discontinuous transmission comprises at least two streams of different visual quality.

4. The apparatus of claim 1, wherein the continuous transmission comprises a streaming transmission and the discontinuous transmission comprises a time-sliced transmission, and wherein each transmission further comprises layered coding.

5. The apparatus of claim 1, wherein the video content having the first visual quality is of a lower resolution than the video content having the second visual quality.

6. The apparatus of claim 2, wherein the instructions, when executed, further cause the apparatus to receive one or more receiving parameters from the terminal via the coupling unit, and set one or more parameters of the apparatus according to the receiving parameters received from the terminal.

7. A method comprising:
receiving, at an apparatus capable of rendering discontinuous transmissions and continuous transmissions, a signal from a broadcast network;
determining whether a signal type of the received signal corresponds to a discontinuous transmission or a continuous transmission; and
in response to the determination, automatically reconfiguring one or more content rendering components in accordance with the determined signal type, wherein the one or more content rendering components are configured to provide instructions for rendering video in the received signal,
wherein automatically reconfiguring the one or more content rendering components includes:
modifying a configuration of the one or more content rendering components to a first configuration in response to determining that the received signal corresponds to the discontinuous transmission; and
modifying the configuration of the one or more content rendering components to a second configuration in response to determining that the received signal corresponds to the continuous transmission,
wherein, when in the first configuration, the one or more content rendering components are configured to render the content having a first visual quality, and when in the second configuration, the one or more content rendering components are configured to render the content having a second visual quality, the first visual quality being different than the second visual quality.

8. The method of claim 7, wherein reconfiguring the one or more content rendering components comprises determining and implementing a first video decoding algorithm corresponding to the content having the first visual quality when in the first configuration and a second video decoding algorithm corresponding to the content having the second visual when in the second configuration.

9. The method of claim 7, wherein determining whether a signal type of the received signal corresponds to a discontinuous transmission or a continuous transmission comprises evaluating one or more parameters carried in the received signal.

10. The method of claim 7, further comprising, prior to receiving the signal from the broadcast network:
receiving a program parameter, from a mobile terminal, for receiving the signal; and
modifying a receiving parameter of the apparatus in accordance with the program parameter to receive the signal from the broadcast network.

11. The method of claim 7, further comprising:
prior to receiving the signal, determining that a program being received on a mobile terminal corresponds to the video in the signal; and
in response thereto, tuning the apparatus to enable the receiving of the signal.

12. The method of claim 7, further comprising:
modifying a power profile of a receiver of the apparatus based on the determined signal type,
wherein the power profile is modified to a first power profile in which the receiver switches between a powered on state and a powered off state in synchronization with the discontinuous transmission when the determined signal type is the discontinuous transmission, and
wherein the power profile is modified to a second power profile in which the receiver is powered on continuously during transmission of the continuous transmission when the determined signal type is the continuous transmission.

13. The method of claim 7, wherein modifying the configuration of the one or more content rendering components to the first configuration includes using a first decoder to render the video carried in the received signal, and
wherein modifying the configuration of the one or more content rendering components to the second configuration includes using a second decoder to render the video carried in the received signal.

14. The method of claim 7, wherein the content having the first visual quality is of a lower resolution than the content having the second visual quality.

15. The method of claim 9, wherein the one or more parameters comprise Transmission Parameter Signaling (TPS) bits.

16. The method of claim 10, further comprising:
determining whether a plurality of program data received from one or more content providers matches the program parameter received from the mobile terminal; and
generating a list of programs corresponding to the program data matching the program parameter.

17. The method of claim 16, wherein the program parameter is assigned a weight.

18. The method of claim 16, wherein determining whether the plurality of program data matches the program parameter includes:
determining whether a similarity between one or more of the plurality of program data and the program parameter exceeds a predetermined threshold.

19. One or more non-transitory computer readable media storing computer readable instructions that, when executed, cause an apparatus to:
- receive a signal from a broadcast network;
- determine whether a signal type of the received signal corresponds to a discontinuous transmission or a continuous transmission; and
- in response to the determination, automatically reconfigure one or more content rendering components in accordance with the determined signal type, wherein the one or more content rendering components are configured to provide instructions for rendering video carried in the received signal,
- wherein automatically reconfiguring the one or more content rendering components includes:
- modifying a configuration of the one or more content rendering components to a first configuration in response to determining that the received signal corresponds to the discontinuous transmission; and
- modifying the configuration of the one or more content rendering components to a second configuration in response to determining that the received signal corresponds to the continuous transmission,
- wherein, when in the first configuration, the one or more content rendering components are configured to render the content having a first visual quality, and when in the second configuration, the one or more content rendering components are configured to render the content having a second visual quality, the first visual quality being different than the second visual quality.

20. The one or more non-transitory computer readable media of claim 19, wherein the computer readable instructions, when executed, further cause the apparatus to, prior to receiving the signal from the broadcast network:
- receive a program parameter, from a mobile terminal, for receiving the signal; and
- modify a receiving parameter of the apparatus in accordance with the program parameter to receive the signal from the broadcast network.

21. The one or more non-transitory computer readable media of claim 19, wherein reconfiguring one or more content rendering components includes determining and using a first decoding algorithm corresponding to the content having the first visual quality when in the first configuration and a second video decoding algorithm, corresponding to the content having the second visual quality when in the second configuration.

22. The one or more non-transitory computer readable media of claim 19, wherein the content having the first visual quality is of a lower resolution than the content having the second visual quality.

23. The one or more non-transitory computer readable media of claim 20, wherein the program parameter includes data embedded in at least one of program specific information and electronic service guide data.

24. An apparatus comprising:
a processor; and
memory operatively coupled to the processor and storing executable instructions that, when executed, cause the apparatus to:
receive a signal from a broadcast network;
determine whether a signal type of the received signal corresponds to a discontinuous transmission or a continuous transmission; and
in response to the determination, automatically reconfigure one or more content rendering components in accordance with the determined signal type, wherein the one or more content rendering components are configured to provide instructions for rendering video carried in the received signal,
wherein automatically reconfiguring the one or more content rendering components includes:
- modifying a configuration of the one or more content rendering components to a first configuration in response to determining that the received signal corresponds to the discontinuous transmission; and
- modifying the configuration of the one or more content rendering components to a second configuration in response to determining that the received signal corresponds to the continuous transmission,
- wherein, when in the first configuration, the one or more content rendering components are configured to render the content having a first visual quality, and when in the second configuration, the one or more content rendering cormponents are configured to render the content having a second visual quality, the first visual quality being different than the second visual quality.

25. The apparatus of claim 24, wherein determining whether the signal type of the received signal corresponds to a discontinuous transmission or a continuous transmission comprises evaluating one or more parameters of the received signal.

26. The apparatus of claim 24, wherein the executable instructions, when executed, further cause the apparatus to, prior to receiving the signal from the broadcast network:
receive a program parameter for receiving the signal from a mobile terminal; and
modify a receiving parameter of the apparatus in accordance with the program parameter to receive the signal from the broadcast network.

27. The apparatus of claim 24, wherein the content having the first visual quality is of a lower resolution than the content having the second visual quality.

* * * * *